United States Patent [19]

Roley

[11] 4,262,914
[45] Apr. 21, 1981

[54] END FACE SEAL ASSEMBLY

[75] Inventor: Robert D. Roley, Peoria, Ill.

[73] Assignee: Caterpillar Tractor Co., Peoria, Ill.

[21] Appl. No.: 140,382

[22] PCT Filed: Dec. 3, 1979

[86] PCT No.: PCT/US79/01036

§ 371 Date: Dec. 3, 1979

§ 102(e) Date: Dec. 3, 1979

[51] Int. Cl.³ .......................... F16J 15/32; F16J 15/34
[52] U.S. Cl. ....................................... 277/84; 277/92;
277/95; 277/152; 305/11
[58] Field of Search ................................. 277/38–43,
277/81 R, 84, 82, 85, 92, 95, 152, 153, 165, 228;
305/11–13

[56] References Cited

U.S. PATENT DOCUMENTS

| | | | |
|---|---|---|---|
| 2,289,274 | 7/1942 | Krug | 277/92 |
| 2,814,513 | 11/1957 | Kupfert et al. | 277/92 |
| 2,871,039 | 1/1959 | Payne | 277/95 |
| 3,135,128 | 6/1964 | Rudolph | 277/96.2 |
| 3,185,488 | 5/1965 | Christensen et al. | 277/95 X |
| 3,195,421 | 7/1965 | Rumsey et al. | 277/82 X |
| 3,241,843 | 3/1966 | Hatch et al. | 277/92 |
| 3,241,844 | 3/1966 | Morley | 277/92 |
| 3,291,494 | 12/1966 | Hatch et al. | 277/92 |
| 3,680,924 | 8/1972 | Otto et al. | 305/11 |
| 3,759,586 | 9/1973 | Otto et al. | 305/11 |
| 3,787,098 | 1/1974 | Orr | 305/11 |
| 3,841,718 | 10/1974 | Reinsma | 305/11 |
| 3,940,154 | 2/1976 | Olsson | 277/92 |
| 4,066,269 | 1/1978 | Linne | 277/228 |
| 4,094,516 | 6/1978 | Morley et al. | 277/92 |
| 4,195,852 | 4/1980 | Roley et al. | 305/11 X |

FOREIGN PATENT DOCUMENTS

| | | | |
|---|---|---|---|
| 879496 | 6/1953 | Fed. Rep. of Germany | 277/95 |
| 2631296 | 3/1977 | Fed. Rep. of Germany | 277/92 |
| 2216965 | 5/1978 | Fed. Rep. of Germany | 277/92 |
| 2846896 | 5/1979 | Fed. Rep. of Germany | 277/92 |
| 1025840 | 4/1966 | United Kingdom | 277/95 |
| 1213820 | 11/1970 | United Kingdom | 277/84 |
| 1232314 | 5/1971 | United Kingdom | 277/152 |

Primary Examiner—Robert S. Ward, Jr.
Attorney, Agent, or Firm—Oscar G. Pence

[57] ABSTRACT

An end face seal assembly (10) has a seal ring (36), a support ring (42), and a resilient load ring (44) having individual preselected properties. The load ring (44) and the support ring (42) have improved cross-sectional configurations and have a precise geometrical relationship to each other and to the joint (12) in which they are received.

5 Claims, 3 Drawing Figures

END FACE SEAL ASSEMBLY

DESCRIPTION

1. Technical Field

This invention relates generally to an end face seal assembly and, more particularly, to an end face seal assembly including a load ring having improved stability and a support ring having an improved cross sectional configuration.

2. Background Art

End face seals are commonly used in severe service environments to exclude external contaminants such as grit, water and the like from joints between relatively movable members. One such application for seals of this type is in the pin joints in endless track chains on track-type earthmoving vehicles. Such track chains operate in extremely abrasive environments under all types of weather conditions. Consequently, the axial face load of the seals must be maintained at a substantial level, for example, above 100 pounds, to insure that the seal will effectively exclude contaminants and retain lubricant, even under conditions of minimum load. In addition, the seal must accommodate a considerable amount of axial motion between the track joint members due to cumulative tolerances in manufacturing, stresses and strains in use, and wear. This imposes substantial demands upon track pin seals, since the seal must not only be sufficiently resilient to follow rapid movements of the joint members over a considerable temperature range, but also must exhibit a substantial wear life.

Extensive development work has been directed toward improving track pin seals. Numerous designs have been proposed, but, for the most part, they have been proven successful in use only to a limited extent.

In the track chain assembly process pairs of adjacent coacting pivotally interconnected links are sequentially pressed onto the ends of associated pins and bushings until a chain of a preselected length is formed. Typically, the links are placed upon roller conveyors, and the seal assemblies are pressed into associated counterbores. Press fitting of the seal assembly in the link counterbore moves the opposite edges of the inner and outer peripheral surfaces of the load ring closer together because of the parallelogram effect. It has been discovered that after assembly, the axial distance between these edges is small enough to render the load ring unstable, that is to say, if the seal assembly is inadvertently bumped on one side, for example by an adjacent link on the conveyor, the axial distance between the opposite edges on the other side may decrease to zero or less. The load ring on that side therefore rotates inwardly and "pops out" of the counterbore. If not noticed and the links are pressed on their respective bushing with the seal not properly positioned, premature failure of the joint occurs.

Still another problem associated with prior art seals of this type results from the relatively high press or interference fit, about 0.5% to 2.0% of the diameter, and the operational relationship between the load ring and the relatively stiff support ring. The magnitude of this fit renders assembly of the seal relatively difficult and leads to inconsistent positioning of the seals in the links in the assembly process. Further, when the load ring is in the compressed state, its exterior face bulges outwardly against the upper inclined inner surface of the support ring creating an undesirable localized area of high strain, in the order of approximately 70% in the bulge portion, as opposed to approximately a uniform 60% strain in the remaining portion of the load ring. This strain discontinuity reduces the fatigue life of the elastomeric material.

Yet another problem arises at the interface between the load ring and the inclined inner surface of the support ring, where the contact forces are relatively high but gradually taper to zero at the point of last contact between the bulge and the incline. This condition permits grit and other contaminants to collect between the two members, and, in operation, the approximately ±1° of "windup" or relative rotational motion between the load ring and the support ring causes substantial erosion of the elastomeric material. Significant erosion of the load ring also occurs on start up and stop of the track where "windup" has been found to be as high as ±4°. This erosion also contributes to premature track pin joint failure and expensive vehicle downtime.

The foregoing illustrates limitations of the known prior art. In view of the above, it would be advantageous to provide an alternative to the prior art in the form of an improved end face seal assembly having a long life expectancy and operational effectiveness over a wide range of deflection in the severe service environment of a track joint, and which seal assembly will overcome the problems associated with the prior art.

DISCLOSURE OF THE INVENTION

In one aspect of the present invention, there is provided an end face seal assembly including a seal ring, a support ring, and load ring having individual preselected properties. The load ring and the support ring each have improved cross-sectional configurations and have a precise geometrical relationship to each other and to the joint in which they are received.

The foregoing and other aspects will become apparent from the following detailed description of the invention when considered in conjunction with the accompanying drawings. It is to be expressly understood, however, that the drawings are not intended as a definition of the invention but are for the purposes of illustration only.

BEST MODE FOR CARRYING OUT THE INVENTION

Figure 1:
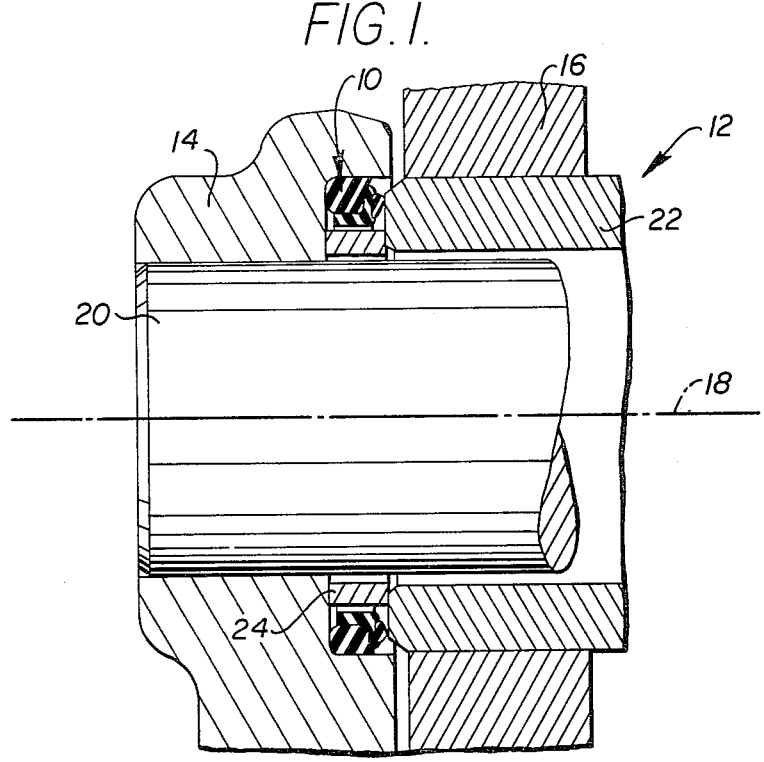
FIG. 1 is a vertical elevational view in cross section of a track joint embodying the end face seal assembly of the present invention.

Referring to FIG. 1, a track joint embodying an end face seal assembly 10 constructed in accordance with the present invention is shown generally by the numeral 12. The track joint includes first and second cooperating, pivotally interconnecting overlapping links 14,16 coaxially mounted along a pivot axis 18 to a track pin 20 and an associated cylindrical bushing 22 respectively and a spacer ring 24 disposed intermediate the links.

Figure 2:
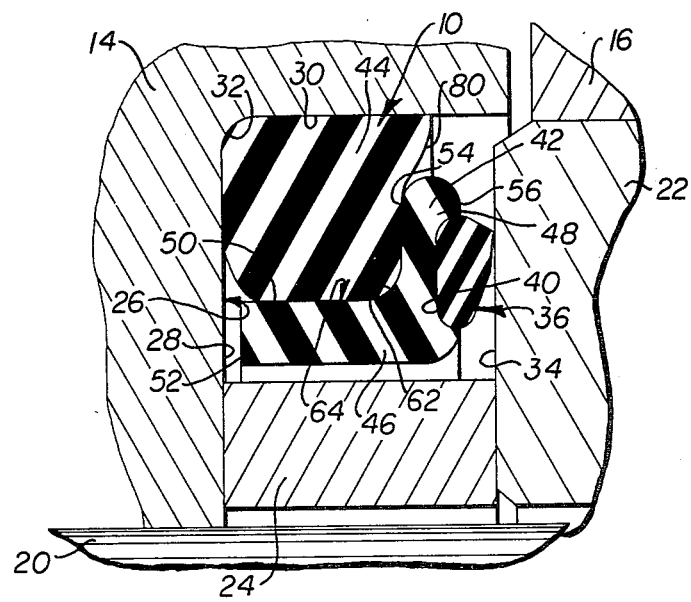
FIG. 2 is an enlarged view of the end face seal assembly and associated members of FIG. 1 to better illustrate the details thereof.

As shown in greater detail in FIG. 2, a counterbore or seat 26 is formed in the first link 14 and is defined by an axially outwardly facing end face 28, a cylindrical surface 30, and a blended arcuate corner portion 32. The spacer ring 24 is loosely positioned on the track pin 20 and abuts the face 28 and an axially inwardly facing end face 34 on the bushing 22 to limit the minimum axial distance therebetween.

The end face seal assembly 10 is disposed generally concentrically with the axis 18 within the counterbore 26 and axially seals against the end face 34 of the bushing 22 to retain lubricant within the track joint 12 and to prevent the entry of dirt or other contaminants therein. The seal assembly includes a resilient seal ring 36 for dynamic primary sealing engagement with the end face 34. The seal ring has a generally triangular cross section having a sealing lip or axial outward face 38 engaging the bushing end face and an annular base 40 which may be securely bonded or otherwise connected to a relatively rigid support ring 42. The seal assembly further includes a resilient load ring 44 for supporting the support ring and the seal ring in the counterbore and for providing static secondary sealing engagement with both the support ring and the counterbore.

Figure 3:
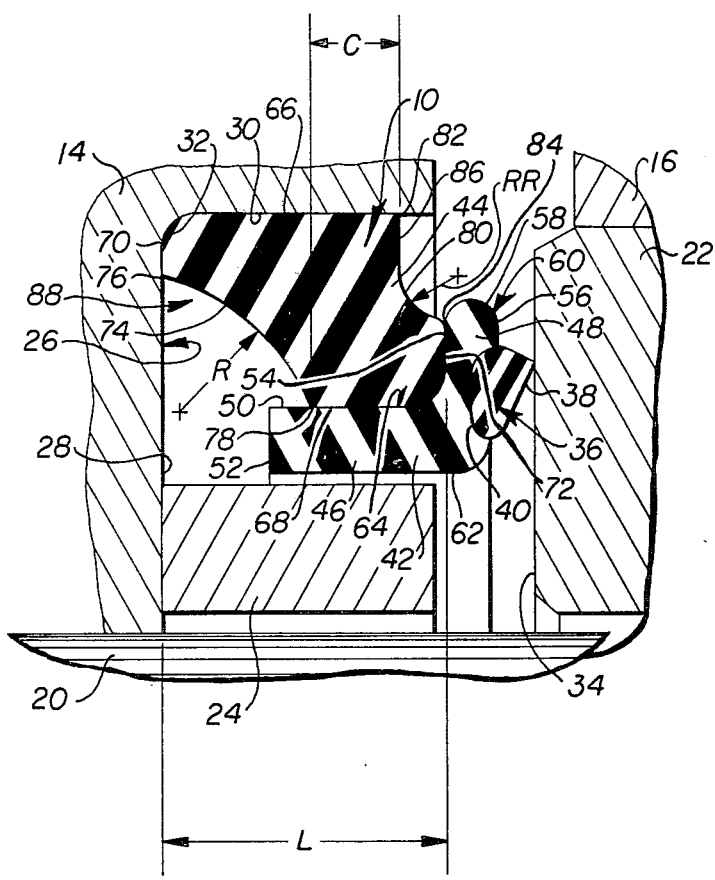
FIG. 3 is an enlarged view of the seal assembly and associated members of FIG. 1 illustrating the seal assembly in the unloaded position or free state.

Referring now to FIGS. 2 and 3, the support ring 42 and the load ring 44 are illustrated in greater detail. The support ring has a generally L-shaped cross sectional configuration having a generally axially extending cylindrical portion 46 and an integrally connected generally radially extending portion 48. The cylindrical portion defines a cylindrical surface 50 and an axially inner end 52, and the radially extending portion defines an axially inwardly facing end face 54, an axially outwardly facing end face or seat 56, and a rounded, radially outer peripheral edge 58 extending therebetween defining a generally rounded end portion 60. The base 40 of the seal ring 36 is bonded or otherwise sealingly secured to the outwardly facing seat of the support ring. Moreover, a blended arcuate corner portion 62 connects the surface 50 and the end face 54 to define a seat 64 that faces opposite the counterbore or seat 26 in the link 14.

The construction of the load ring 44 is best illustrated in FIG. 3 where it is shown in the unloaded or free state. The load ring is preferably constructed of an elastomeric resilient material, for example epichlorohydrin copolymer rubber having a durometer "A" scale hardness magnitude in a range of about 40 to 70 and a relatively low tensile modulus magnitude (Young's modulus) of approximately 3 MPa (500 psi). The free cross section thereof is of a generally parallelogram shaped configuration defined by cooperating substantially cylindrical, axially extending, outer and inner peripheral surfaces 66,68, a first end face 70 extending radially inwardly from the outer peripheral surface, a second end face 72 extending radially outwardly from the inner peripheral surface, a generally concave interior surface 74 extending between the first end face at a first edge 76 and the inner peripheral surface at a second edge 78, and a generally concave exterior surface 80 extending between the outer peripheral surface at a third edge 82 and the second end face at a fourth edge 84.

The outer peripheral surface 66 of the load ring 44 is in a press fit relationship with the cylindrical surface 30 of the counterbore 26. Similarly, the inner peripheral surface 68 is in a press fit relationship with the cylindrical surface 50 of the support ring 42. The load ring is solely connected to the counterbore and support ring by these pressed or interference fits without the use of a binding agent. Preferably, both fits lie within a range of a free fit to about 0.4% of the diameters of the cylindrical surfaces 30 and 50 respectively.

A preferred construction parameter of the load ring 44 exists in the preselected geometry of the interior surface 74 when it is in the unloaded or free state. The interior surface is characterized by a shallow arcuate recess defined by a revolved radius R having a length within a range of about 0.9 to about 1.5 times the distance between the first and the second edges 76,78. It has been determined that by keeping the radius length within this preselected range, buckling of the load ring will be avoided, if, for example, the radius is too small. Conversely, if the radius is too large, the axial face load upon the seal ring will increase undesirably fast, because the compressed load ring will fill the available space in the counterbore 26 too rapidly.

Another preferred construction parameter of the load ring 44 resides in the preselected geometry of the exterior surface 80 when it is in the unloaded or free state. The exterior surface is characterized by a shallow arcuate recess defined in combination by a radial outer portion 86 normal to the axis 18 and by a revolved radius RR, as indicated on the drawing, having a length within a range of about 0.45 to about 1.2 times the distance between the third and the fourth edges 82,84. Preferably the radius has a length within a range of about 0.5 to about 0.7 times the distance between the third and fourth edges, and ideally, the radius has a length approximately equal to about 0.6 times the distance between the third and the fourth edges.

Yet another preferred construction parameter of the load ring 44 exists in the preselected axial distance C between the second and third edges 78,82 in the free state. Within the restrictive limitations imposed by the radial and axial dimensions of the counterbore receiving the seal assembly, it is advantageous to maintain this distance within a preselected range to control the stability of the load ring. Preferably, the axial distance C between the second and third edges is within the range of about 0.25 to about 0.6 times the overall axial length L of the load ring. Ideally, this distance is within a range of about 0.3 to about 0.35 times the overall axial length of the load ring.

Industrial Applicability

With the parts assembled as set forth above, the end face seal assembly 10 of the present invention has application wherever it is desirable to provide a seal between two members having relative rotational and limited axial movement therebetween. One such application is in a track pin joint 12 in an endless track chain on track-type earthmoving vehicles.

In operation, the end face seal assembly 10 provides a gradually increasing axial face load on the sealing lip 38 as the load ring 44 is loaded in shear between the seats 26 and 64 and compressed between the free state illustrated in FIG. 3 and the fully loaded state illustrated in FIG. 2 in response to relative axial movement between the first and second links 14,16. The axiall face load is maintained at a preselected minimum value upon the initial installation of the seal assembly in the track joint in order to assure positive retention of lubricant and to exclude the entry of foreign contaminants therein. Importantly, the decreased interference or pressed fit relationship of the load ring and the cylindrical surface 30 of the counterbore 26 results in increased ease of installation of the seal and better consistency in assembly thereof.

As the seal assembly 10 is compressed, the exterior surface 80 of the load ring 44 is deformed in such a way that its concave shape becomes generally curvilinear, as is best illustrated in FIG. 2. It is of significance to note that in the compressed state, the improved load ring is free from the undesirable axially outwardly bulging of the exterior surface of prior art load rings and the resultant strain discontinuity between the bulging portion and the remaining portion thereof. Moreover, the exterior load ring surface and the generally rounded end portion 60 of the support ring are constructed and arranged so as to be free from engagement with one another when the seal assembly is compressed. Advantageously, the absence of contact between these seal assembly members 80,60 eliminates the accumulation of dirt and other foreign contaminants therebetween eliminating erosion of the elastomeric material of the load ring and associated premature failure of the seal assembly.

Simultaneously, as the load ring 44 is compressed the interior surface 74 engages the end face 28 of the link 14 and also allows a controlled increase of the internal strain rate of the load ring. Specifically, the unfilled area 88 between the link end face and the load ring is at least 90% filled by the load ring in the position of maximum compression which maximizes effective use of the minimal available space and avoids weakening of the first link 14 as would be the case with a counterbore of larger dimensions.

While the present invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the scope thereof. Therefore, it is intended that the invention not be limited to the particular embodiments disclosed, but that the invention will include all embodiments falling within the scope of the appended claims.

I claim:

1. In an end face seal assembly (10) having a resilient load ring (44) and a seal and support ring means (36,42) concentrically disposed about a central axis (18), the load ring (44) being positionable between a first seat (26) provided within a first member (14) and a second seat (64) defined about the seal and support means (36,42) for axially urging the seal and support ring means (36,42) into sealing engagement against an end face (34) of a second member (22), said resilient load ring (44) being defined by a plurality of preselected surfaces including a cylindrical outer peripheral surface (66) and a first end face (70) extending radially inwardly therefrom for joint engagement with said first seat (26), a cylindrical inner peripheral surface (68) and a second end face (72) extending radially outwardly therefrom for joint engagement with said second seat (64), an interior surface (74) connected between the first end face (70) and the inner surface (68), and an exterior surface (80) connected between the outer surface (66) and the second end face (72), the improvement comprising:

said exterior surface (80) having a shallow arcuate recess in cross-section defined by a radially extending outer portion (86) connected to said outer surface (66) and a revolved radius (RR) extending from said outer portion (86) to said second end face (72), said radially extending outer portion (86) being normal to said central axis (18).

2. The end face seal assembly (10) of claim 1 wherein said exterior surface (80) extends between an edge (82) on the outer surface (66) and another edge (84) on the second end face (72) and wherein the revolved radius (RR) has a length within a range of about 0.45 to about 1.2 times the distance between said edges (82,84).

3. The end face seal assembly (10) of claim 1 wherein said load ring (44) in the free state has an overall axial length (L) between said end faces (70,72) and said exterior surface (80) extends from said outer cylindrical surface (66) at an edge (82) and said interior surface (74) extends from said inner cylindrical surface (68) at another edge (78), said edges (82,78) being disposed intermediate said end faces (70,72) and axially spaced apart from each other a preselected axial distance (C), said axial distance being within a range of about 0.25 to about 0.6 times the overall axial length (L).

4. The end face seal assembly (10) of claim 3 wherein said axial distance (C) is within a range of about 0.3 to about 0.35 times the overall axial length (L).

5. The end face seal assembly (10) of claim 1 wherein said seal and support ring means (36,42) includes a generally radially extending portion (48) having a generally rounded end portion (60) provided thereon and wherein said load ring (44) is so constructed and arranged that in response to axial loading, said exterior surface (80) deflects in a manner so as to be free from contact with said rounded end portion (60).

* * * * *